(12) United States Patent
Markowski et al.

(10) Patent No.: US 10,350,867 B2
(45) Date of Patent: Jul. 16, 2019

(54) COMPOSITE THERMOPLASTIC LAMINATE

(71) Applicant: XAMAX INDUSTRIES, INC., Seymour, CT (US)

(72) Inventors: Robert G. Markowski, Wallingford, CT (US); Martin J. Weinberg, New Canaan, CT (US); James Yuan, Westport, CT (US)

(73) Assignee: XAMAX INDUSTRIES, INC., Seymour, CT (US)

( * ) Notice: Subject to any disclaimer, the term of this patent is extended or adjusted under 35 U.S.C. 154(b) by 0 days.

(21) Appl. No.: 15/466,699

(22) Filed: Mar. 22, 2017

(65) Prior Publication Data
US 2017/0190162 A1 Jul. 6, 2017

Related U.S. Application Data

(62) Division of application No. 14/827,227, filed on Aug. 14, 2015, now Pat. No. 9,636,893.

(60) Provisional application No. 62/037,766, filed on Aug. 15, 2014.

(51) Int. Cl.
*B23B 37/00* (2006.01)
*B32B 37/06* (2006.01)
(Continued)

(52) U.S. Cl.
CPC .............. *B32B 37/06* (2013.01); *B29C 65/02* (2013.01); *B29C 66/45* (2013.01); *B29C 66/712* (2013.01); *B29C 66/727* (2013.01); *B29C 66/7294* (2013.01); *B32B 3/266* (2013.01); *B32B 5/022* (2013.01); *B32B 5/06* (2013.01); *B32B 5/145* (2013.01); *B32B 5/18* (2013.01); *B32B 7/08* (2013.01); *B32B 7/10* (2013.01);
(Continued)

(58) Field of Classification Search
CPC ....... B32B 37/003; B32B 37/06; B32B 37/02; B32B 37/08; B29C 66/342; B29C 66/91641; B29C 66/91645; B29C 66/92441; B29C 66/92445; B29C 66/0342; B29C 66/0244; B29C 66/349
USPC .................. 156/312, 308.2–309.6, 182, 311
See application file for complete search history.

(56) References Cited

U.S. PATENT DOCUMENTS

| | | |
|---|---|---|
| 4,379,806 A | 4/1983 | Korpman |
| 4,389,437 A | 6/1983 | Hungerford |

(Continued)

FOREIGN PATENT DOCUMENTS

| | | |
|---|---|---|
| JP | 08199119 A * | 8/1996 |
| WO | 2013056027 A1 | 4/2013 |

OTHER PUBLICATIONS

Machine translation of JP 08-199119 date unknown.*

(Continued)

*Primary Examiner* — John L Goff, II
(74) *Attorney, Agent, or Firm* — Baker & McKenzie LLP

(57) ABSTRACT

A composite sheet material includes a cover sheet, a substrate and an adhesion promoting layer. The cover sheet has a cover sheet material. The substrate has a substrate material. The adhesion promoting layer is disposed between the cover sheet and the substrate. A first side of the adhesion promoting layer disposed towards the cover sheet has an affinity to bond with the cover sheet material. A second side of the adhesion promoting layer disposed towards the substrate has an affinity to bond with the substrate material.

30 Claims, 5 Drawing Sheets

(51) Int. Cl.
| | |
|---|---|
| *B32B 27/08* | (2006.01) |
| *B32B 37/10* | (2006.01) |
| *B32B 27/36* | (2006.01) |
| *B32B 27/40* | (2006.01) |
| *B32B 27/30* | (2006.01) |
| *B32B 7/12* | (2006.01) |
| *B32B 27/32* | (2006.01) |
| *B32B 27/18* | (2006.01) |
| *B32B 27/28* | (2006.01) |
| *B32B 27/34* | (2006.01) |
| *B32B 5/02* | (2006.01) |
| *B32B 5/06* | (2006.01) |
| *B32B 27/12* | (2006.01) |
| *B29C 65/02* | (2006.01) |
| *B29C 65/00* | (2006.01) |
| *B32B 3/26* | (2006.01) |
| *B32B 5/18* | (2006.01) |
| *B32B 37/02* | (2006.01) |
| *B32B 37/16* | (2006.01) |
| *B32B 5/14* | (2006.01) |
| *B32B 7/08* | (2019.01) |
| *B32B 7/10* | (2006.01) |
| *B32B 7/04* | (2019.01) |
| *C09J 133/06* | (2006.01) |
| *C09J 133/14* | (2006.01) |
| *C09J 133/02* | (2006.01) |
| *C09J 123/14* | (2006.01) |
| *C09J 175/04* | (2006.01) |
| *C09J 123/08* | (2006.01) |
| *C08K 5/3415* | (2006.01) |
| *C08K 5/353* | (2006.01) |
| *B29K 623/00* | (2006.01) |
| *B29K 667/00* | (2006.01) |
| *B29K 675/00* | (2006.01) |

(52) U.S. Cl.
CPC ............ *B32B 7/12* (2013.01); *B32B 27/08* (2013.01); *B32B 27/12* (2013.01); *B32B 27/18* (2013.01); *B32B 27/281* (2013.01); *B32B 27/286* (2013.01); *B32B 27/306* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *B32B 37/02* (2013.01); *B32B 37/10* (2013.01); *B32B 37/16* (2013.01); *B29K 2623/06* (2013.01); *B29K 2667/003* (2013.01); *B29K 2675/00* (2013.01); *B32B 7/04* (2013.01); *B32B 27/30* (2013.01); *B32B 2250/03* (2013.01); *B32B 2250/04* (2013.01); *B32B 2255/10* (2013.01); *B32B 2255/26* (2013.01); *B32B 2260/021* (2013.01); *B32B 2260/046* (2013.01); *B32B 2262/0284* (2013.01); *B32B 2266/0214* (2013.01); *B32B 2307/3065* (2013.01); *B32B 2307/516* (2013.01); *B32B 2307/518* (2013.01); *B32B 2307/554* (2013.01); *B32B 2307/558* (2013.01); *B32B 2307/714* (2013.01); *B32B 2307/7163* (2013.01); *B32B 2323/04* (2013.01); *B32B 2323/10* (2013.01); *B32B 2333/00* (2013.01); *B32B 2367/00* (2013.01); *B32B 2375/00* (2013.01); *C08K 5/3415* (2013.01); *C08K 5/353* (2013.01); *C09J 123/08* (2013.01); *C09J 123/0869* (2013.01); *C09J 123/0892* (2013.01); *C09J 123/14* (2013.01); *C09J 123/147* (2013.01); *C09J 133/02* (2013.01); *C09J 133/064* (2013.01); *C09J 133/14* (2013.01); *C09J 175/04* (2013.01); *C09J 2423/106* (2013.01); *C09J 2467/006* (2013.01); *Y10T 428/31565* (2015.04); *Y10T 428/31573* (2015.04); *Y10T 428/31576* (2015.04); *Y10T 428/31587* (2015.04); *Y10T 428/31797* (2015.04); *Y10T 428/31909* (2015.04); *Y10T 428/31913* (2015.04); *Y10T 428/31928* (2015.04); *Y10T 428/31935* (2015.04); *Y10T 428/31938* (2015.04)

(56) References Cited

U.S. PATENT DOCUMENTS

| | | | |
|---|---|---|---|
| 4,474,928 | A | 10/1984 | Hoenig et al. |
| 4,499,130 | A | 2/1985 | Questel et al. |
| 4,532,187 | A | 7/1985 | Hoenig et al. |
| 4,623,413 | A | 11/1986 | Questel et al. |
| 4,632,869 | A | 12/1986 | Park et al. |
| 4,771,108 | A | 9/1988 | Mackenzie |
| 4,965,123 | A | 10/1990 | Swan et al. |
| 5,161,093 | A | 11/1992 | Gorczyca et al. |
| 5,242,757 | A | 9/1993 | Buisine et al. |
| 5,248,364 | A * | 9/1993 | Liu ............... B29C 47/0021 156/244.11 |
| 5,288,780 | A * | 2/1994 | Jarzombek ......... C08J 7/047 524/127 |
| 5,391,429 | A | 2/1995 | Otani et al. |
| 5,637,366 | A | 6/1997 | Davis et al. |
| 6,165,602 | A | 12/2000 | Fujita |
| 6,221,191 | B1 | 4/2001 | Davis et al. |
| 6,555,240 | B1 | 4/2003 | Nishikori et al. |
| 6,872,458 | B1 | 3/2005 | Rudd et al. |
| 2005/0069716 | A1 | 3/2005 | Sasongko et al. |
| 2005/0075428 | A1 | 4/2005 | Ddamulira et al. |
| 2005/0084693 | A1 | 4/2005 | LaBrec |
| 2006/0172094 | A1* | 8/2006 | Shi ............... B41M 7/0027 428/32.24 |
| 2006/0205869 | A1 | 9/2006 | Steidl et al. |
| 2006/0293424 | A1 | 12/2006 | Tse et al. |
| 2007/0009750 | A1 | 1/2007 | Ito et al. |
| 2007/0021566 | A1 | 1/2007 | Tse et al. |
| 2008/0032148 | A1 | 2/2008 | Lee et al. |
| 2008/0145670 | A1 | 6/2008 | Song et al. |
| 2009/0041983 | A1 | 2/2009 | Gaeta et al. |
| 2009/0061137 | A1 | 3/2009 | Konrad et al. |
| 2009/0061138 | A1 | 3/2009 | Peiffer et al. |
| 2009/0068453 | A1 | 3/2009 | Chung |
| 2009/0068483 | A1 | 3/2009 | Morikawa et al. |
| 2009/0104830 | A1 | 4/2009 | Ikeda |
| 2009/0280318 | A1 | 11/2009 | Matsugi et al. |
| 2009/0291284 | A1 | 11/2009 | Frauenhofer et al. |
| 2010/0018646 | A1* | 1/2010 | Metzger ............ B32B 17/10871 156/285 |
| 2010/0307680 | A1* | 12/2010 | Gorodisher ............ C08G 73/06 156/311 |
| 2011/0045288 | A1 | 2/2011 | Koda et al. |
| 2011/0112249 | A1 | 5/2011 | Takarada et al. |
| 2011/0135916 | A1 | 6/2011 | Lu |
| 2012/0095164 | A1 | 4/2012 | Blum et al. |
| 2013/0078471 | A1* | 3/2013 | Hiraki ............... C08G 18/0823 428/413 |
| 2013/0133743 | A1* | 5/2013 | Grah ............... C09D 4/00 136/259 |
| 2014/0147642 | A1 | 5/2014 | Weinberg et al. |
| 2014/0170400 | A1 | 6/2014 | Gilliam et al. |
| 2016/0046104 | A1 | 2/2016 | Grah |

OTHER PUBLICATIONS remichem.com "Polyethylene" as captured by archive.org on Jul. 4, 2015.*
montachem.com "Exelene LLDPE" Dec. 2007.*

(56) References Cited

OTHER PUBLICATIONS

International Search Report and Written Opinion, PCT/US15/45398, dated Jan. 6, 2016, 15 pages.
Oxazoline functionalized reactive copolymers—Novel Low tonic Polymer Crosslinker and Adhesion Promoting agent for waterborne, EPOCROS, Nippon Shokubai Co., Ltd., Feb. 28, 2014, 8 pages.
"2PAUN Adherable Film," Product Bulletin, Mitsubishi Poyester Film, Inc., (C)2000-2008, 2013, 2 pages, www.m-petfilm.com.
"RTPA1 Opaque White Film," Product Bulletin, Mitsubishi Poyester Film, Inc., (C)2015, 2 pages, www.m-petfilm.com.
Office Action issued by Chinese Patent Office dated Sep. 7, 2018 in connection with Chinese Patent Application No. 201580056199.2.

\* cited by examiner

US 10,350,867 B2

COMPOSITE THERMOPLASTIC LAMINATE

CROSS-REFERENCE TO RELATED APPLICATIONS

This application is a divisional of U.S. patent application Ser. No. 14/827,227, filed Aug. 14, 2015, now U.S. Pat. No. 9,636,893, which claims priority to U.S. Provisional App. Ser. No. 62/037,766, filed Aug. 15, 2014, which are hereby incorporated by reference in their entirety.

BACKGROUND

The present disclosure relates generally to composite sheet materials that include a thermoplastic material, and methods of forming the same.

Composite materials and laminates that include nonwoven material with a thermoplastic material have various applications. The outer surface of such composite materials may suffer from defects. Some undesirable qualities can include poor scratch resistance, poor abrasion qualities, poor stain resistance, poor color brilliance, poor weather ability, difficulty in adhering, chalking, crazing, undesirable appearance, uneven surface finish, and not accepting paint or print well.

Improved composite sheets and methods of forming the same that improved some of these defects would be advantageous.

BRIEF SUMMARY

In an embodiment, a composite sheet material includes a cover sheet, a substrate and an adhesion promoting layer. The cover sheet has a cover sheet material. The substrate has a substrate material. The adhesion promoting layer is disposed between the cover sheet and the substrate. A first side of the adhesion promoting layer disposed towards the cover sheet has an affinity to bond with the cover sheet material. A second side of the adhesion promoting layer disposed towards the substrate has an affinity to bond with the substrate material.

In another embodiment, a method of forming a composite sheet material includes providing a cover sheet having a cover sheet material; providing a substrate having a substrate material; providing an adhesion promoting layer disposed between the cover sheet and the substrate; and applying a first temperature and first pressure for a first time period to the cover sheet, the substrate as part of a first formation process that combines the cover sheet, the substrate and the adhesive promoting layer into a laminate. A first side of the adhesive promoting layer disposed towards the cover sheet has an affinity to bond with the cover sheet material. A second side of the adhesive promoting layer disposed towards the substrate has an affinity to bond with the substrate material.

In another embodiment, a composite sheet material includes a thermoplastic layer and a support thermoplastic membrane component. A melting point of the support thermoplastic membrane component is higher than a melting point of the first thermoplastic layer. The first thermoplastic layer is adjacent to the support thermoplastic membrane component. The first thermoplastic layer and the support thermoplastic membrane component together provide a laminate having a region where the first thermoplastic material and the thermoplastic membrane material are intermixed.

In another embodiment, a method of forming a composite sheet material includes applying a first temperature and first pressure for a first time period as part of a first formation process that combines one or more layers of into a matrix; allowing the matrix to cool down to a lower temperature; and applying a second temperature and second pressure for a second time period as part of a second formation process that combines the matrix and a substrate. The applying the second temperature and second pressure for a second time period provides a larger amount of energy to the matrix and the substrate than the applying the first temperature and first pressure for the first time period provides to the matrix.

DETAILED DESCRIPTION

Various aspects of composite material sheets and related methods for forming the same according to the present disclosure are described. It is to be understood, however, that the following explanation is merely exemplary in describing the devices and methods of the present disclosure. Accordingly, any number of reasonable and foreseeable modifications, changes, and/or substitutions are contemplated without departing from the spirit and scope of the present disclosure.

Figure 1:
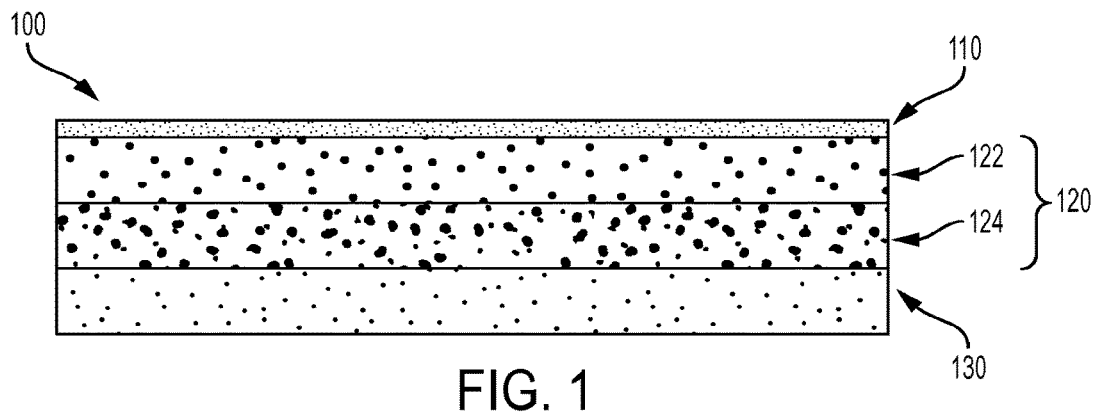
FIG. 1 is a cross-sectional view of a composite sheet material including a thermoplastic component and a support component.

FIG. 1 illustrates a composite sheet material 100 including a cover sheet 110, a matrix 120 and a substrate 130. Matrix 120 includes a thermoplastic component 122 and a support component 124.

Cover sheet 110 may be permanent or removable and is also optional. It may be formed of BOPET (biaxially-oriented polyethylene terephthalate), PET (polyethylene terephthalate), PA (polyamide—e.g., nylon), BOPA (biaxially-oriented polyamide) Acrylic, polyvinyl fluoride film (PVF), BOPP (biaxially-oriented polypropylene), PP (polypropylene), PU (polyurethane), thermoplastic polyurethane (TPU), polycarbonate (PC), copolymers and/or combinations (including oriented, uniaxially-oriented, biaxially-oriented, and non-oriented variations thereof) of any of the foregoing, cellulosic or synthetic fiber (e.g., paper, that may also be coated). In embodiments where cover sheet 110 is removable, the cover sheet material may be cellulosic or synthetic fiber (e.g., paper, that may also be coated). The cover sheet 110 may be provided as a film and have coating layers (or additives) to improve its bond to other layers. Exemplary additives (or additive layers) include EVA (ethylene vinyl acetate), EMA (ethylyne methyl acrylate), MA (maleic anhydride), "BYNEL" (coextrudable adhesive resin manufactured by DuPont), "ELVAX" (ethylene vinyl acetate copolymer resin manufactured by DuPont), EAA (Ethylene Acrylic Acid) such as DuPont Nucrel®, MAA (Methacrylic acid), LLDPE (Linear Low Density Polyethylene), and silanes, or any other additive or treatment discussed in this disclosure with respect to a cover sheet. It may also include pigments, have a gloss or matte outside (or inside, if removable) (e.g., top) surface, may be printed with decorative or logo patterns, or may contain anti-microbial additive, metallic, reflective, Phosphorescencent, and/or other decorative additives, UV inhibitors, static and/or a RF dissipating or barrier (such as metallic additives, coatings or layers (e.g., metalizing)).

The substrate 130 may include one or more thermoplastic materials such as, but not limited to, polypropylene (PP), polylactic acid (PLA), polyethylene terephthalate (PET), polybutylene terephthalate (PBT), polyethylene (PE), polyamide (PA), Polyphenylene ether/oxide (PPO), Polycarbonates (PC), Polyphenylene sulfide (PPS), Acrylonitrile butadiene styrene (ABS), acrylic, PU, polyvinyl chloride (PVC), Polyoxymethylene ("POM"), or "Acetal", or as the DuPont product Delrin®), and copolymers thereof, which may be in fiber, strand, extruded, or particle form. The substrate may also include (e.g. have an internal or external layer of) thermoset materials such as unsaturated polyesters, epoxy, vinyl esters, polyurethanes, phenolic, silicones, melamine, polystyrene. The substrate 130 may also include non-thermoplastic materials such as cotton, wood pulp, rayon, bagasse, phenolic, basalt, wool, fiberglass, flax, bamboo, carbon fiber, aramid, etc., and combinations thereof, also typically in fiber, chopped fiber, woven, stitched, particle, braided or continuous strand form; e.g., for reinforcing purposes, etc. Materials within the substrate 130 may be made in a woven or non-woven form, or using random laid fibers. In those embodiments where the substrate 130 is (or contains) a nonwoven, the substrate 130 can be made using wetlaid, drylaid, pointbond, spunbond, spunlace, spinlaced, airlaid, needle punched or meltblown processes, or thermal bond processes, or combinations thereof. The substrate 130 may alternatively include a bicomponent nonwoven having two different polymers arranged within a web. A preferred bicomponent nonwoven is a continuous filament spunbond type bicomponent non-woven. Bicomponent nonwovens may utilize a sheath and core construction, wherein a core filament made of one resin is completely surrounded by a sheath of a different resin, or may also be separate fibers. The performance of the bicomponent nonwoven benefits from the characteristics (e.g., strength, flexibility, softening and melt point, etc) of both the sheath and core materials. Many polymer materials can be used in a bicomponent nonwoven, including but not limited to, polyester, polypropylene, polyethylene, nylon, fiber glass, and polylactic acid as well as any other nonwoven chemistry discussed in this disclosure. An example of an acceptable bicomponent nonwoven is one having polypropylene or polyethylene sheath and a polyester core. The substrate 130 may include a single layer of a material, or may be formed of multiple layers of the same material, or multiple layers of more than one type of material. The substrate 130 may include one or more additives, including those that function as ultraviolet (UV) inhibitors and thermal stabilizers, those that make the substrate fire-resistant, and other additives such as pigments, wetting agents, anti-microbial agents, hydrophilic agents, and hydrophobic agents. The substrate 130 may also include one or more additives, including those that function as ultraviolet (UV) inhibitors and thermal stabilizers, those that make the composite sheet material 100 fire-resistant, and other various additives such as pigments, silicones, additives that improve stain resistance and cleanability (e.g., PTFE and other fluoropolymers), wetting agents, anti-microbial agents, anti-gas fade agents (e.g., chemical resistance agents), hydrophilic agents, hydrophobic agents. In those embodiments where a portion, or all, of the substrate 130 is extruded, the substrate 130 may also include process aids to improve extrusion surface uniformity. The substrate 130 may also include one or more of the following additives: biodegradable additives, grease resistant additives, antioxidant additives, slip agents, additives to minimize or eliminate static electricity, and conductive and/or semi-conductive particles or fibers. The characteristics (e.g., fire-resistance, UV inhibitors, etc.) of the various additives and components described above as potential constituents within the substrate 130, are not limited to the substrate 130, but may also be described as being a part of the composite sheet material 100 of which the thermoplastic component is a portion. The substrate 130 is not, however, limited to these additives.

The materials used to create the substrate 130 may be arranged in particular orientations to give the substrate 130 desirable mechanical characteristics. For example, in those embodiments that utilize fibrous materials in the substrate 130, the fibers can be oriented to provide desirable stiffness, impact resistance, flexibility, etc. In those embodiments in which the substrate 130 includes more than one layer, the content and orientation of the different layers can be also selected and arranged to enhance the mechanical characteristics; e.g., thermoplastic materials that enhance the impact resistance, flex strength, and/or tensile strength of the substrate 130, and glass or other reinforcing fibers that enhance the stiffness of the substrate 130.

The matrix 120 may be attached to a surface of substrate 130. The matrix 120 includes a thermoplastic component layer 122 and woven or non-woven support component layer 124. Support component layer 124 may have a higher melt temperature than that of the thermoplastic component layer 122.

Figure 2:
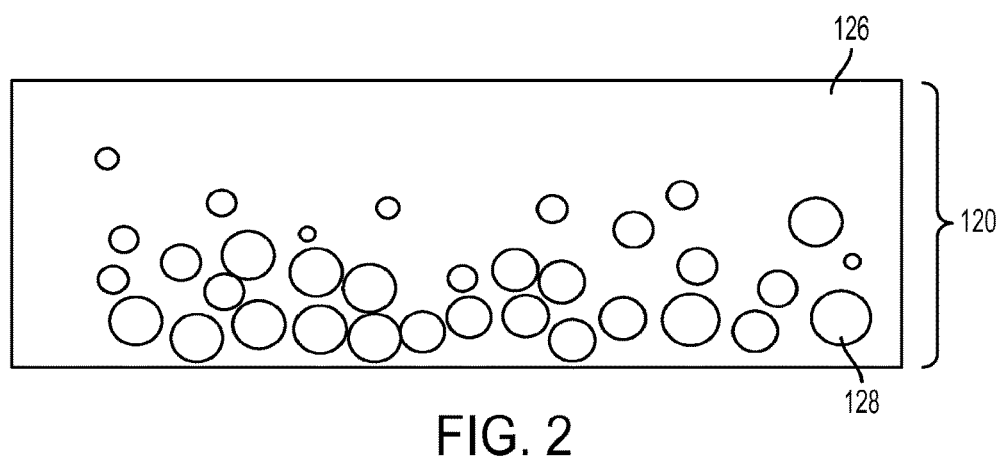
FIG. 2 is a cross-sectional view of a matrix.

The thermoplastic component 122 may substantially consist of, but is not limited to, configurations of the following materials (and co-polymers thereof) having a melting point lower than that of the support component 124 material: polypropylene (PP), polyethylene (PE), polyethylene terephthalate (PET), low-density polyethylene (LDPE), polyurethane (PU), polyamide (PA), polyamide-imide (PAI), ionomer (e.g., Surlyn®, Surlyn Reflections®—which is an ionomer with a polyamide—, etc.), acrylic, metallocenes (i.e., a type of thermoplastic material), etc. The higher melting point of the support component 124 material allows the thermoplastic component 122 to melt and at least partially migrate through the support component 124 without the support component 124 melting, softening or being damaged, during the initial formation of the matrix (and in some embodiments also migrate through and into contact with the substrate 130 when the substrate 130 and the matrix 120 are joined to one another under an elevated heat and pressure process). Thus, the combination of the thermoplastic component 122 and the support component 124 has a higher concentration of thermoplastic component material 126 at one side (e.g., towards the cover sheet 110) and a higher concentration of support component material 128 at the opposing side towards the substrate 130, as shown in FIG. 2. Consequently, the support component 124 helps to define the matrix 120 relative to the substrate 130. Note that certain polymers may be available in a plurality of different forms, and collectively they may have a wide range of melting points. In some instances, it may be possible to use a first variation of a particular thermoplastic material for the support component 124 and a second variation of the same thermoplastic material for the thermoplastic component 122, provided the two variations have sufficiently different melting points. The thermoplastic component 122 may also include one or more additives, including those that function as ultraviolet (UV) inhibitors and thermal stabilizers, those that make the composite sheet material 100 fire-resistant, and other various additives such as pigments, silicones, additives that improve stain resistance and cleanability (e.g., PTFE and other fluoropolymers), wetting agents, anti-microbial agents, anti-gas fade agents (e.g., chemical resistance agents), hydrophilic agents, hydrophobic agents, or any other additive or treatment discussed in this disclosure with respect to a cover sheet. In those embodiments where a portion, or all, of the thermoplastic component 122 is extruded, the thermoplastic component 122 may also include process aids to improve extrusion surface uniformity. The thermoplastic component 122 may also include one or more of the following additives: biodegradable additives, grease resistant additives, antioxidant additives, slip agents, additives to minimize or eliminate static electricity, and conductive and/or semi-conductive particles or fibers. The characteristics (e.g., fire-resistance, UV inhibitors, etc.) of the various additives and components described above as potential constituents within the thermoplastic component 122, are not limited to the thermoplastic component 122, but may also be described as being a part of the composite sheet material 100 of which the thermoplastic component 122 is a portion.

The thermoplastic component 122 may be applied to the support component 124 as a coating. The thermoplastic component 122 coating initially resides on a face surface of the support component 124, and/or may at least partially saturate the substrate 130 prior to the composite sheet material 100 formation processes (e.g., thermo-pressure lamination). The coating may be applied to the support component 124 using an extrusion process, or any other known process operable to apply the thermoplastic component 122 as a coating. In one example of an extrusion process, both the thermoplastic component 122 and the support component 124 could be formed together in a single pass extrusion process. Alternatively, the thermoplastic component 122 may initially assume a sheet form disposed on one side of the support component 124. The one or more sheets of the thermoplastic component 122 may be joined (e.g., laminated) to the support component 124 to form the matrix, and subsequently the matrix 120 can be attached to the substrate 130. Alternatively, the support component 124 and the one or more sheets of the thermoplastic component 122 may be stacked together with the substrate 130, and all joined together simultaneously; e.g., in an elevated heat and pressure process. Post matrix or composite sheet formation, a sufficient amount of thermoplastic component 122 resides on the exterior surface of the matrix 120 to form a substantially uninterrupted surface consisting of the thermoplastic component 122, and some amount of thermoplastic component 122 is in contact with the face surface of the substrate 130 facing support component 124, as can be seen in FIG. 1. It will be appreciated that the use of the term substantially contemplates the presence some impurities or inconsistencies as a result of the limitations of manufacturing processes and limitations on tolerances of constituent component materials.

Regardless of its form (coating, sheet, etc.), the thermoplastic component 122 may assume a single layer, or may include a plurality of independent layers. In those embodiments where the thermoplastic component 122 includes a plurality of different layers (e.g., multilayer extrusion, or a multilayer sheet, etc.), the material of the specific layers and their position within the stack up of layers can be selected to enhance one or more characteristics of the present composite sheet material 100; e.g., thermal, optical, graphic, barrier, durability, surface appearance, and cost characteristics. For example, a multilayer thermoplastic component 122 can be chosen to enhance the surface characteristics of the matrix 120, and therefore the surface characteristics of the composite sheet material 100. The thermoplastic component 122 layers can be processed to provide the matrix 120 (and therefore the composite sheet material 100) with a flat or textured exterior surface (e.g., a matte or dimpled surface, and/or a surface that includes three dimensional patterns, and/or one embossed with graphic patterns, etc.). Similarly, the material(s) of the thermoplastic component 122 can give, or be finished to give, the matrix 120 a flat non-gloss appearance, or a high-gloss appearance, or anything in between. The thermoplastic component 122 may also be configured to facilitate the deposition of characters or a design on the matrix 120 (e.g., the characteristics of the outer layer of the thermoplastic component 122 may be chosen to facilitate the printing), or the deposition of characters or a design within the matrix 120 (e.g., printing on a subsurface layer of the matrix 120 that is visible on the surface). The surface characteristics can be selected to suit the intended application of the composite sheet material 100. In some embodiments, one or more bonding materials operable to ensure bonding adhesion between the independent layers can also be included between the layers. A bonding layer may also be used to improve the bond to the support component 124, as well as the other side, if a cover sheet 110 is used.

The prior description of cover sheet 110, thermoplastic component layer 122, and substrate 130 is applicable to the embodiments described below.

It is preferable to reduce or eliminate surface defects in the thermoplastic component layer 122. One potential source of defects in the thermoplastic layer 122 is the support component layer 124. For example, support component layer 124 may cause air entrapment, such as voids and air pockets that may cause bubbles within or on the surface of thermoplastic component layer 122. Also, bonding points and fiber distribution patterns may "print through" or "telegraph" to the surface of thermoplastic component layer 122, causing surface irregularities that mirror the bond point and fiber distribution pattern of the support component layer 124. A second potential source of defects is the substrate 130. For example, fiberglass fibers may print through or telegraph through the support component layer 124 and thermoplastic component layer 122, causing surface irregularities that mirror the irregular fibers in the substrate.

A two pass process may be used to try to achieve a higher quality surface, such as Class A surface, but a one pass process may be preferable. For example, a single pass may provide for faster or lower cost manufacturing as well as the potential for lower scrap and associated scrap costs associated with additional manufacturing processes. Various embodiments that may yield a high quality surface limiting or eliminating surface defects in the matrix that can be achieved using a one pass process are described next.

Figure 3:
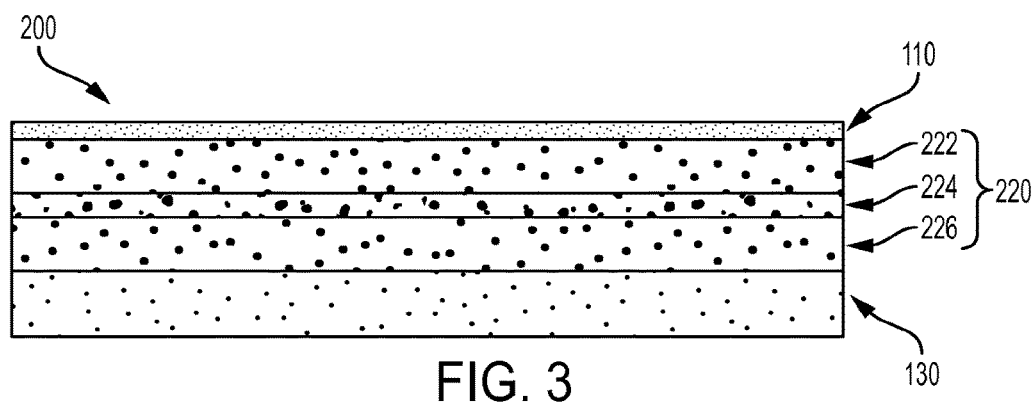
FIG. 3 is a cross-sectional view of a composite sheet material including thermoplastic component layers and a support thermoplastic membrane component layer.

FIG. 3 illustrates a composite sheet material 200 including a cover sheet 110, a matrix 220 and a substrate 130, according to an example embodiment. Matrix 220 includes a thermoplastic component layer 222, a support thermoplastic membrane component layer 224, and a thermoplastic component layer 226. In an example, the cover sheet 110 and the matrix 220 may be manufactured (e.g., laminated) in a single pass. In another example, the cover sheet 110, the matrix 220, and the substrate 130 may be manufactured (e.g., laminated) in a single pass.

Thermoplastic component layer 222 may be formed of polypropylene (PP), biaxially-oriented polypropylene (BOPP), polyethylene (PE), polyethylene terephthalate (PET), low-density polyethylene (LDPE), polyurethane (PU), polyamide (PA), polyamide-imide (PAI), ionomer (e.g., Surlyn®, Surlyn Reflections®—which is an ionomer with a polyamide—, etc.), acrylic, metallocenes (i.e., a type of thermoplastic material), etc., or copolymers and/or combinations thereof (including oriented, uniaxially-oriented, biaxially-oriented, and non-oriented variations thereof). It may have coating layers (or additives) to improve its bond to other layers. Exemplary additives (or additive layers) may be any of the ones described above with reference to cover sheet 110. Thermoplastic component layer 222 may improve surface quality. It may contain UV improving additives, may include pigments, may have a gloss or matte outside (e.g., top) surface (for example, if cover sheet 110 is omitted), may be printed with decorative or logo patterns (particularly if cover sheet 110 is omitted), and may contain anti-microbial additives and other decorative additives, or any other additive or treatment discussed in this disclosure with respect to a cover sheet.

Support thermoplastic membrane component layer 224 may have a higher melting point than that of thermoplastic layers 222 and 226. It may be formed of PET, PP, PEN (polyethylene naphthalate), PPSU (polyphenylsulfone), PSU (polysulfone), PES (polyether sulfone), PEI (polyetherimide), PA, Rayon, PU, polyimide (PI), acrylic or copolymers and/or combinations thereof (including oriented, uniaxially-oriented, biaxially-oriented, and non-oriented variations thereof). In an example, the support thermoplastic membrane component layer may be a PET nonwoven material, which may be spunlaced, needled, wet laid, air laid or chemical bonded. Exemplary advantages of using a spun laced nonwoven for the support thermoplastic membrane include bleeding off air in nips that reduces pock marks, voids, and defects between the cover sheet and the thermoplastic layer, a reduced textured pattern; parallel fiber distributions; finer denier than a spun bond, a smoother surface, better opacity. Exemplary advantages of needled PET or blends including PP or other materials include bleeding off air in nips that reduces pock marks, voids, and defects between the cover sheet and the thermoplastic layer, and a reduced textured pattern. PP, PET or other nonwoven sheet materials may be needled to the top and/or bottom of the thermoplastic membrane component layer. The support thermoplastic membrane component layer 224 may also be provided as a solid film.

Support thermoplastic membrane component layer 224 may have coating layers (or additives) to improve its bond to other layers. Exemplary additives (or additive layers) may be any of the ones described above with reference to cover sheet 110.

Thermoplastic component layer 226 (if used—this is an optional layer) may have a thickness that is varied depending on the size or number of voids and/or fiber irregularities, and/or other factors in the substrate 130. It may be formed of PP, PE or copolymers and/or combinations thereof (including oriented, uniaxially-oriented, biaxially-oriented, and non-oriented variations thereof). It may also have coating layers (or additives) to improve its bond to other layers. Exemplary additives (or additive layers) may be any of the ones described above with reference to cover sheet 110. Thermoplastic component layer 226 may also contain UV improving additives, may include pigments, and may contain anti-microbial additives. Of course, it will be appreciated that the advantages of the thermoplastic membrane component layer 224 discussed above may also be provided without the thermoplastic component layer 226 in an arrangement similar to FIG. 1 (e.g., the thermoplastic membrane component layer 224 is used in place of the support component 124).

Figure 4:
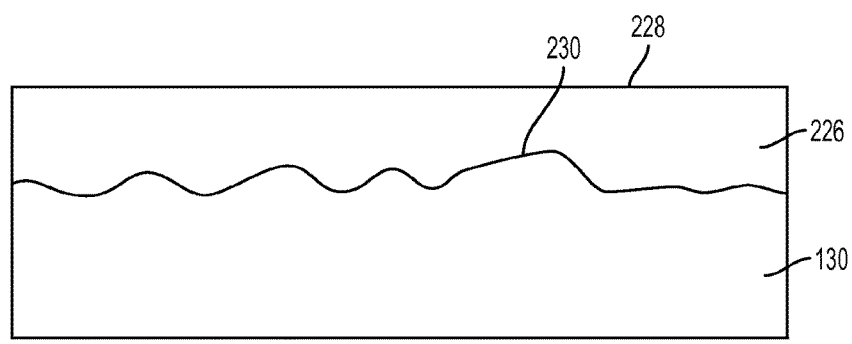
FIG. 4 is a cross-sectional view of a substrate and a thermoplastic layer.

In an embodiment, thermoplastic component layer 226 may be added in a second melt formation process in which it melts and becomes semi-sacrificial by filling voids in the substrate 130, for example as shown in FIG. 4. Thus, a surface 228 of the thermoplastic component layer 226 may be more regular (e.g., smoother having less irregularities or undulations) than a surface 230 of the substrate 130. Filling in the voids may reduce print through of irregular fiber sizes in the substrate 130.

Support thermoplastic membrane component layer 224 may prevent thermoplastic component layer 222 from thermally combining, or melting, with the substrate 130. Support thermoplastic membrane component layer 224 may also reduce print through of bonding points occurring in a nonwoven that adhere fibers together and fiber distribution pattern to the surface of thermoplastic component layer 222 by using a continuous coverage film (e.g., thermoplastic layer) instead of a nonwoven.

Support thermoplastic membrane component layer 224 may permanently adhere to thermoplastic component layers 222 and 226 through a covalent bond (or other methods) using a mechanism of thermal and/or pressure bond inducing additives (or coated surfaces) added to support thermoplastic membrane component layer 224 and/or thermoplastic component layers 222 and 226 to improve adhesion. Exemplary additives (or additive layers) include EVA (ethylene vinyl acetate), EMA (ethylyne methyl acrylate), MA (maleic anhydride), "BYNEL" (coextrudable adhesive resin manufactured by DuPont), "ELVAX" (ethylene vinyl acetate copolymer resin manufactured by DuPont), EAA (Ethylene Acrylic Acid), MAA (Methacrylic acid), LLDPE (Linear Low Density Polyethylene), and silanes. An adhesion additive layer containing oxazoline in an acrylic resin or ethylene acrylic acid copolymer mixed with oxazoline may also be used. Such an adhesion additive layer may improve adhesion of PP and PET layers.

The thermoplastic component layers 222 and 226 and the support thermoplastic membrane component layer 224 may be formed in a single tri-extrusion process. The cover sheet 110, the thermoplastic component layers 222 and 226 and the support thermoplastic membrane component layer 224 may also be processed in a single pass using a tri-extrusion with an independently applied cover sheet 110. This single pass tri-extrusion with the independently applied cover sheet 110 is preferred as it may reduce or eliminate most or all surface imperfections.

The cover sheet 110, the thermoplastic component layers 222 and 226 and the support thermoplastic membrane component layer 224 may also be processed (e.g., laminated) in a single pass using a quad-extrusion. The quad extrusion is preferred as it may reduce or eliminate most or all surface imperfections.

Figure 9:
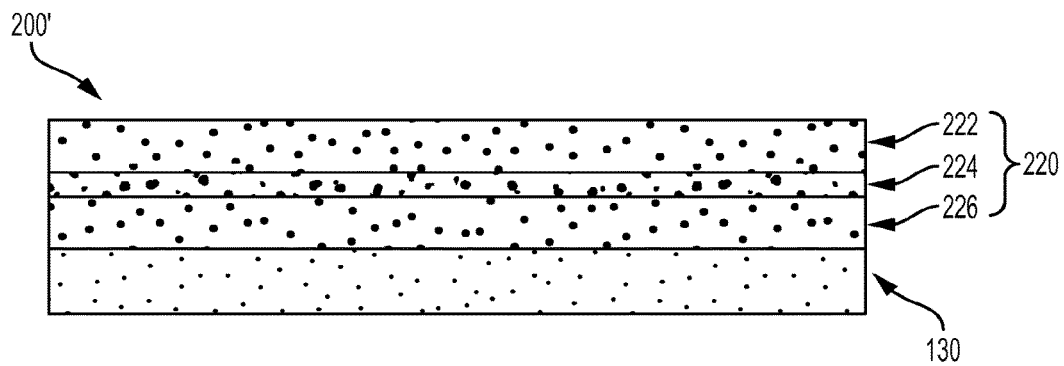
FIG. 9 is a cross-sectional view of a composite sheet material without a cover sheet.

The composite 200 may be formed with or without the cover sheet 110 depending upon the desired surface finish. The cover sheet 110 may be removable or permanently bonded. The cover sheet 110 may also be optional and omitted. An example of the composite 200 without the cover sheet 110 is shown in FIG. 9. One way to determine whether one layer (such as the cover sheet) is "permanently" bonded to another layer is to use the ASTM D-3359 standard test for cross hatch adhesion. If the layer remains adhered after the tape test of the ASTM D-3359 is performed, it may be considered "permanent." Another way to test whether a layer is permanently bonded is if the layer does not release when abraded.

Figure 5:
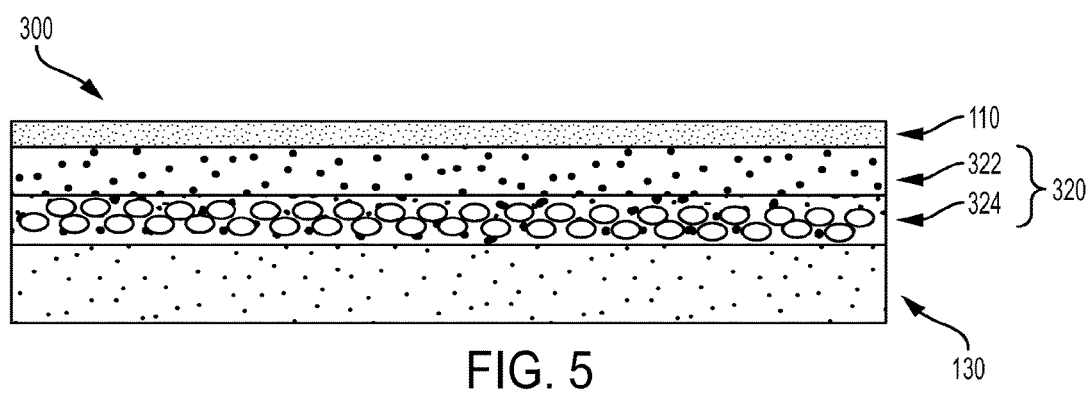
FIG. 5 is a cross-sectional view of a composite sheet material including a thermoplastic component layer and a support thermoplastic membrane component layer.

FIG. 5 illustrates a composite sheet material 300 including a cover sheet 110, a matrix 320 and a substrate 130, according to an example embodiment. Matrix 320 includes a thermoplastic component layer 322 and a support thermoplastic membrane component layer 324. The support thermoplastic membrane component layer 324 may be macro porous or include micro apertures. Macro porous refers to materials having pore diameters of greater than 50 nm whereas meso porous refers to materials having pore diameters between 2 and 50 nm and micro porous refers to materials having pore diameters of less than 2 nm. Micro apertures on the other hand refers to apertures on the order of hundreds of microns. Thus, the use of macro in the context of porosity and micro in the context of apertures is not a comparison of size between the two approaches, which have different frames of reference by which "macro" and "micro" are to be understood.

Figure 6:
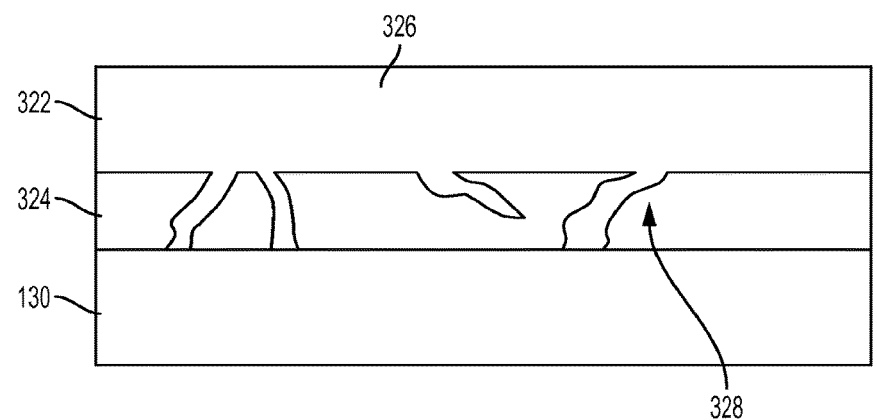
FIG. 6 is a cross-sectional view of an enlarged portion of the composite sheet material of FIG. 5.

In the embodiment where the support thermoplastic membrane component layer 324 includes macro porous pathways, a small portion of the thermoplastic component may seep (or migrate) through and bond against the substrate 130. For example, as shown in FIG. 6, a small portion of the thermoplastic material 326 of the thermoplastic component layer 322 is disposed through the macro porous pathways 328 such that some of the thermoplastic material 326 is in contact with the substrate 130 (or exposed on an outer surface of the thermoplastic membrane component layer 324.

The macro porous support thermoplastic membrane component layer 324 may be formed of PET, PEN, PPSU, PSU, PES, PEI, PA, acrylic, or copolymers and/or combinations thereof, and may have coating layers (or additives) to improve its bond to the thermoplastic component layer 322. For example, the macro porous thermoplastic membrane component layer 324 may be extruded using calcium carbonate additives, polymeric mixture additives or other additives to form the macro porous pathways in the thermoplastic material. Preferably the macro porous pathways are 25 microns to 500 microns wide.

Figure 7:
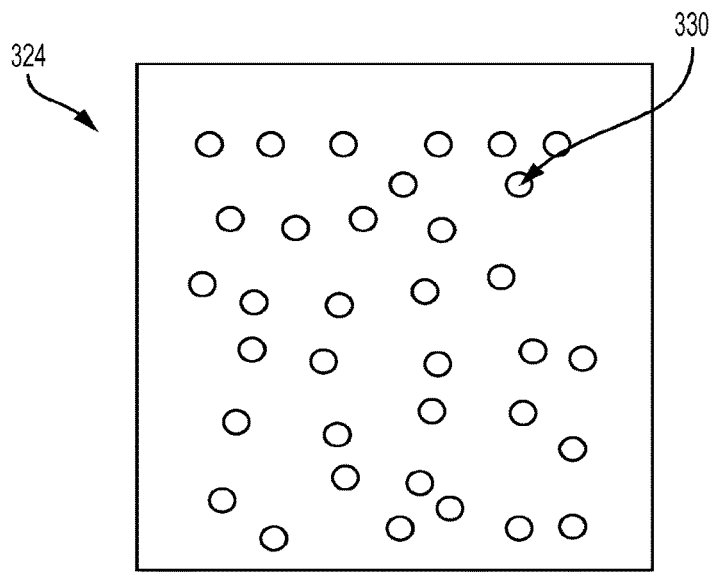
FIG. 7 is a top view of an exemplary thermoplastic membrane component layer of FIG. 5.

In place of or in addition to the macro porous pathways, the support thermoplastic membrane component layer 324 may include micro apertures. For example, as shown in FIG. 7, the apertures 330 may be punched or needled in the thermoplastic membrane component layer 324 to provide the path for the small portion of thermoplastic component to seep (or migrate) through and bond against the substrate 130. The micro aperture thermoplastic membrane component layer 324 may be formed of PET, PEN, PPSU, PSU, PES, PEI, PA, acrylic, or copolymers and/or combinations thereof, and may have coating layers (or additives) to improve its bond to the thermoplastic component layer 322. The micro apertured support thermoplastic membrane component 324 may be provided as a film having apertures of 200 to 600 microns in size.

The support thermoplastic membrane component layer 324 may prevent the thermoplastic component layer 322 from thermally combining (melting) with the substrate 130, thus providing layer separation.

The support thermoplastic membrane component layer 324 may avoid print through of bonding points occurring in a nonwoven that adhere fibers together to the surface of thermoplastic component layer 222 by using the thermoplastic membrane component layer to acting as a support component. This may allow a small amount of the polymer of the thermoplastic component 322 to pass through and promote adhesion with the substrate 130.

The support thermoplastic membrane component layer 324 may permanently adhere to thermoplastic component layer 322 and substrate 130 through a covalent bond (or other methods) using a mechanism of thermal and/or pressure bond inducing additives (or coated surfaces) added to the thermoplastic membrane component layer 324 and/or thermoplastic component layer 322 and the substrate 130 to improve adhesion. Exemplary additives (or additive layers) may be EVA, EMA, MA, "BYNEL", "ELVAX," EAA, Nucrel, MAA, and/or LLDPE Plus, or any other additive or treatment discussed in this disclosure with respect to a cover sheet.

The thermoplastic component layer 322 and the thermoplastic membrane component layer 324 may be formed in a single co-extrusion process. The cover sheet 110, the thermoplastic component layer 322, and the support thermoplastic membrane component layer 324 may also be processed in a single pass using a bi-extrusion and an independently applied cover sheet 110. This single pass bi-extrusion with the independently applied cover sheet 110 is preferred as it may reduce or eliminate most or all surface imperfections.

The cover sheet 110, the thermoplastic component layer 322, and the support thermoplastic membrane component layer 324 may also be processed (e.g., laminated) in a single pass using a tri-extrusion. The tri-extrusion is preferred as it may reduce or eliminate most or all surface imperfections.

The composite 300 may be formed with or without cover sheet 110 depending upon the desired surface finish. Cover sheet 110 may be removable or permanently bonded. Cover sheet 110 may also be optional and omitted.

Whether support thermoplastic component membrane layer 324 is macro porous, micro aperture or both, the pores or apertures may be large enough to allow a small amount of the thermoplastic component material of the thermoplastic component layer 322 to pass (or migrate) therethrough (e.g., in a melted state). The support thermoplastic component membrane layer 324 may have a higher melting point than that of thermoplastic component layer 322.

Figure 8:
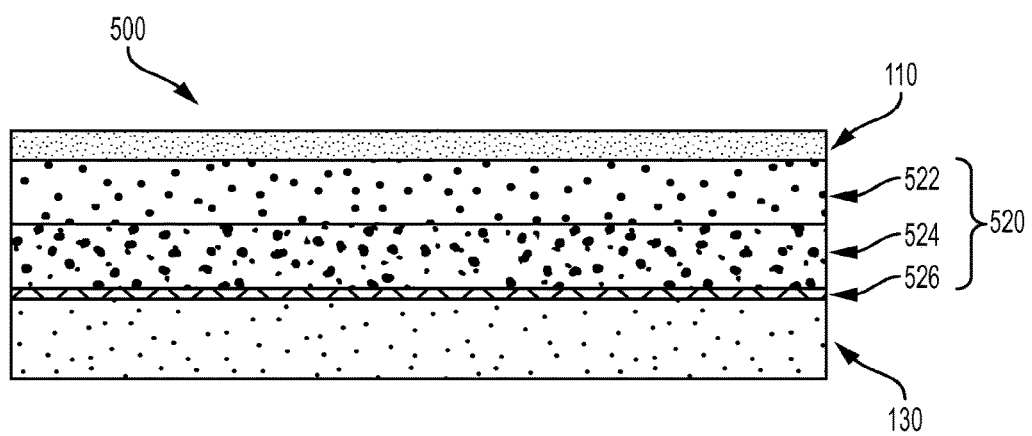
FIG. 8 is a cross-sectional view of a composite sheet material including a thermoplastic component layer and a support thermoplastic micro aperture membrane component layer, according to an embodiment.

FIG. 8 illustrates a composite sheet material 500 including a cover sheet 110, a matrix 520 and a substrate 130, according to an example embodiment. The matrix 520 includes a thermoplastic component layer 522 and a support thermoplastic membrane component layer 524. The support thermoplastic membrane component layer may include a bonding layer 526 that may adhere to the substrate 130.

The thermoplastic component layer 522, the support thermoplastic membrane component layer 524, and the bonding layer 526 may be processed in a single pass using a tri-extrusion. The cover sheet 110 and the thermoplastic layer 522 may be independent films that can be laminated or extruded together to form a laminate of that also includes the support thermoplastic membrane component layer 524. The support thermoplastic membrane component 524 may be manufactured with the bonding layer 526 and supplied together. The cover sheet 110, the matrix 520, and the substrate 130 may also be combined (e.g., laminated) at the same time. Of course, the cover sheet 110 may include any of the coatings discussed in this disclosure, for example, to improve adhesion to urethane coatings, accept decals, accept paint and so forth.

The composite 500 may be formed with or without cover sheet 110 depending upon the desired surface finish. Cover sheet 110 may be removable or permanently bonded. Cover sheet 110 may also be optional and omitted.

With reference to composites 200, 300, 400, and 500, cover sheet 110 and substrate 130 may be formed as described with reference to composite 100. With further references to composites 200, 300, 400, and 500, thermoplastic components 222, 226, 322, 422, and 522 may be formed as described with reference to thermoplastic component 122. In certain embodiments, the coversheet 110 may be BOPET with a bonding layer to be permanently bonded to the thermoplastic component 222, 226, 322, 422, and 522; the thermoplastic component 222, 226, 322, 422, and 522 may be PP; and support thermoplastic membrane components may be any variety of the substrates described previously.

With continuing reference to composites 200, 300, 400, and 500, the thermoplastic component 222, 226, 322, 422, and 522 disposed over the substrate 130 may include two layers. The first layer of the thermoplastic component includes polypropylene, polyethylene, polyamide or a combination or copolymer thereof, and is disposed over the substrate. The second layer of the thermoplastic component includes polypropylene, polyethylene, polyamide or a combination or copolymer thereof, and is disposed over the first layer of the thermoplastic component such that the first layer of the thermoplastic component is between the substrate and the second layer of the thermoplastic component.

In another example, the thermoplastic component 226, 322, 422, and 522 disposed over the substrate 130 includes two layers. The first layer of the thermoplastic component includes polypropylene, polyethylene, polyamide or a combination or copolymer thereof. The first layer of the thermoplastic component is disposed over the substrate. The second layer of the thermoplastic component includes polypropylene, polyethylene, polyamide or a combination or copolymer thereof. The second layer of the thermoplastic component is disposed over the first layer of the thermoplastic component such that the first layer of the thermoplastic component is between the substrate and the second layer of the thermoplastic component. A cover sheet is disposed over the thermoplastic component such that the thermoplastic component is between the substrate and the cover sheet. The cover sheet may be a sheet or extruded material that is permanent or removable. The cover sheet may include polyester, polypropylene, polyethylene, polyamide, or combinations or copolymers thereof.

A cover sheet may optionally be disposed over the two layer thermoplastic component such that both layers of the thermoplastic component are between the substrate 130 and the cover sheet 110. The cover sheet 110 may be a sheet or extruded material that is permanent or removable. The cover sheet 110 may include polyester, polypropylene, polyethylene, polyamide, or combinations or copolymers thereof (or any other material discussed in the disclosure with respect to the cover sheet 110). The composite may further include a bonding agent layer disposed between the cover sheet and the thermoplastic component.

In still another example, wet laid paper, or thermal bonded (such as HOVOTherm 155 manufactured by Hollingsworth & Vose) with uniform small fiber distribution may be used as the support component 224, 324, 524. The support component may also be a calendared web of (e.g., PET, PA, or any other material discussed in the this disclosure with respect to a support component) fibers.

In certain embodiments, a PET nonwoven may be applied to the bottom of the substrate 130 (opposite to the matrix side) to adhere to the substrate 130 via melted PP migrated from the substrate with heat and pressure. This PET nonwoven may be a heavy weight (e.g., 2 to 4 oz/yd$^2$) PET non woven. This complete composite (with heavy weight nonwoven side) may then be adhered to another surface (such as wood, aluminum, steel, fiberglass, etc.) to form a product in a second process at a different time.

The nonwoven may be fibrous and have a poor bonding strength on its own due to the limited thickness-direction adhesion strength of the exposed nonwoven fibers. The exposed fibers in contact with an adhesive applied to adhere the nonwoven to an end user's surface may become removable, which may cause the composite to peel off the end user's surface.

Figure 10:
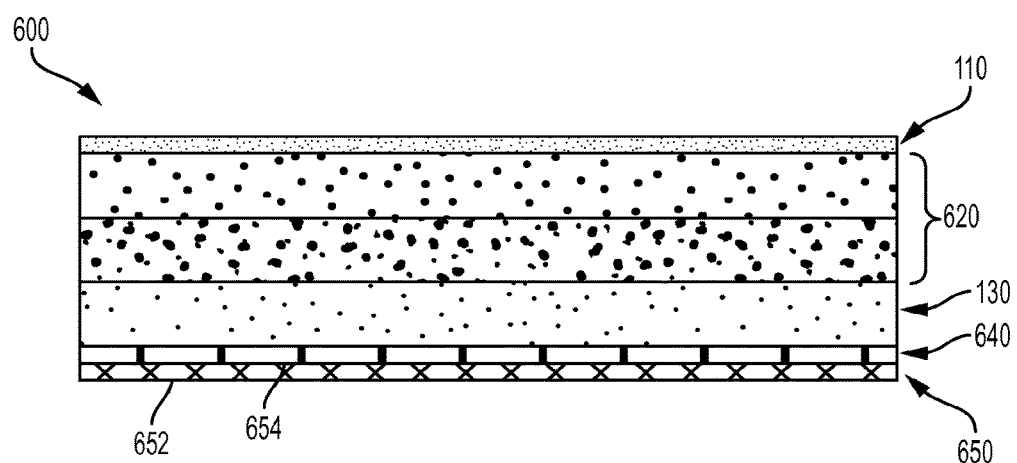
FIG. 10 is a cross-sectional view of a composite sheet material including a thermoplastic component layer and a support thermoplastic membrane component layer with a bonding layer, according to an embodiment.

With reference to FIG. 10, a composite sheet material 600 may include a cover sheet 110, a matrix 620, a substrate 130, and backing material layers 640 and 650. Matrix 620 may be any of matrices 120, 220, 320, 420, and 520. The backing layer 650 may have a continuous film surface 652. The surface 652 may include a coating such as a PU friendly coating or any of the coatings discussed with respect to the cover sheet 110 to, for example, improve adhesion to urethane coatings, accept decals, accept paint and so forth.

The backing layer 650 may have a higher melt point than the thermoplastic fibers of the substrate 130, so it may remain contiguous after the thermo pressure forming process of the composite 600. The backing layer 650 may include films of PET, PA, PI, PPSU, PAI, etc.

Opposing surface 654 of the backing layer 650 (or coating attached thereto such as the backing layer 640) may adhere permanently to the substrate 130 as a result of the thermo pressure forming process of the composite 600. In an embodiment, backing layer 640 is a coating attached to the surface 654 of the backing layer 650, such as a PP or PE thermoplastic coating and/or any combination of the coupling agents described previously to insure bonding to the substrate 130. In order to bond a PP or PE coating 640 to backing layer 650, the backing layer 650 may also be constructed with a primer that promotes bond coating to the PP or PE. The thermoplastic layer 640 and the backing layer 650 may be PP, PET, or PE thermoplastic and may be coextruded in a single process.

In an embodiment, backing layer 650 may also be used without a bonding layer 640, and may be disposed on the substrate 130 directly. A primer (or coextrusion) may be included on a side facing substrate 130 to promote bonding to the end user's surface. Adhesion promoting additives may be included in the film polymer, or an adhesion promoting polymer may also be provided, such as those discussed with respect to the cover sheet 110. A PP adhesive, PET, PU or adhesive film (or coating) may also be used in place of the bonding layer 640.

It will be appreciated that there are many variations that may be applied to the disclosed principles within the scope of this disclosure. For example, a permanent top layer film formed of a material such as an acrylic film or polyvinyl fluoride film (PVF), may be included in any of the above described embodiments. It will be appreciated that the permanent top layer film formed of an acrylic film or PVF may also be employed in embodiments having a nonwoven support layer.

In addition, the thermoplastic component and/or the cover sheet in the above embodiments can contain a blend of polymers and other ingredients that give the surface appearance a metallic hue, such as a "metal flake" look. The degree or level of intensity can be adjusted by the amount of metallic polymer and other pigments or reflective materials added within the thermoplastic component and/or permanent cover sheet. Other decorative effects, such as glow in dark (phosphorescence), and fluorescent effects may be applied.

A method of forming composites such as but not limited to those discussed above will now be discussed. The process may include a first and second heating process. The first heating process may be a single process or a combination of processes. Once the composite sheet material is formed, a second heating process can be performed to adhere the sheet to another surface. For example, after the first formation process, the composite sheet may be cooled down and transported to another site for use at a later time. Then, the second heating process can be performed to adhere composite sheet to a desired surface.

The first heating process may be conducted at a temperature, pressure, and time specified for the extrusion (or formation or lamination) of the matrix and cover sheet or cover sheet laminate. As an example, the first heating process may be specified as: Temperature 400-450° F., Pressure 30-75 psi, Time 50-200 ms. The parameters for the first heating process (e.g., temperature, pressure, and time) may not be sufficient to fully bond the matrix and coversheet (and any bonding layer therebetween) because not enough energy (e.g., temperature, pressure, and time or combinations thereof) is applied to cause the elements (bonding active components) of the matrix and cover sheet to link to provide a full bond. For example, a physical bond may be created at this stage when enough energy has not been imparted to cause covalent bonding. After the first heating process is complete, the composite material may be allowed to cool, for example to room temperature (e.g., below 100° F.).

The second heating process may be conducted at a temperature, pressure, and time specified for the thermoforming (or combining) of matrix (and cover sheet if included) with the substrate. As an example, the second heating process may be specified as: Temperature 375-500° F., Pressure 75-125 psi, Time 15-60 secs. The pressure applied in the second heating process may be greater than the pressure applied in the first heating process. The duration of the second heating process may be greater than the duration of the first heating process. The total energy (e.g., temperature*time*pressure) may be greater than the total energy in the first heating process. The energy applied to the cover sheet and matrix in the form of temperature, pressure, and time when it is being combined with the substrate may further form bonds with the coversheet with the matrix thereby completing (achieving) the bond.

This division of processing may be beneficial, for example, when a first facility can perform the first process, and then the material can be moved to a second facility that can perform the second process. The first heating process may link the materials sufficiently to allow handling and transportation of the materials while allowing for more economical manufacturing both in terms of speed and energy expended. The second heating process may complete the lamination of the layers of the composite when they are exposed to the higher energy of the process to combine with the substrate.

With reference to compositions that are preferred for the two heating pass formation, adhesion may be created by mechanical interdigitating of two surfaces, molecular mixing generated via solvent or heat expose or by using a reactive chemical to create covalent bonds between layers.

Surface treatments may be used to modify PET surfaces to improve their adhesion to polyolefins, polyurethanes, and nylon. Examples of such surface treatments include:

1. Solvent treatment: A solvent may allow the dissolution of the surface polymer chains (e.g., PET) and provide an opportunity for the chain entanglement with the opposing polymer layer (eg. PP).

2. Corona discharge treatment: Corona treatment may increase the surface oxidation and change the surface energy of the polymer layers.

3. Plasma treatment: Similar to corona treatment, plasma treatment may increase the oxidation level of the surface and change the surface energy of the polymer layers.

4. Flame treatment: Similar to plasma and corona treatments, flame treatment may increase the oxidation level of the surface and change the surface energy of the polymer layers.

5. UV light treatment: Upon exposure to deep UV light (e.g., 274 nm) in air, oxygen at the surface may react with functional groups of the polymer surface to create oxygenated species and alter the surface energy of the polymer.

6. Radiation treatment: High energy radiation treatment (e.g., e-beam exposure) may cause breakage of chemical bonds within PET or PP layer. This treatment may increase the number of oxygen containing species on the surface thus affect the polarity/surface energy of the surface.

7. Sand blasting treatment: This treatment may increase the surface roughness of the polymer and allow (or increase) the mechanical interdigitation of the layers during the lamination (e.g., high temp and pressure) process.

8. Ion plating treatment: This treatment may deposit hard coatings on a substrate. The volatility of the coating materials affects the coating uniformity and functionality of the coatings.

9. Surface coating treatment: Several types of coatings may be applied to a PET surface to improve its adhesion characteristics including: polyurethane, isocyanate containing molecules, polyols, and cross linker (epoxy, melamine, carbodiimide, or oxazolines); polycyclic aromatic structure, and oxazoline cross linker; maleic anhydride functionalized PP layer, which can be applied to the PP via a compounding (e.g., mixing) process, that can promote an anhydride reaction with PET end groups and provides a route for covalent bonding; application of a wax including as a main component an aliphatic ester compound of a higher fatty acid having 17 to 33 carbon atoms, with an alcohol having 17 to 33 carbon atoms on PP or PET surface (carnauba wax and montan wax are examples that provide mixing with PP during an extruding process, and allows the acid end group functionalization of the PET layer); application of wax with a copolyester as a top coat may also provide adhesion characteristics to PP; depositing a layer of acrylic (methacrylic) copolymer, with mono-ethylenically unsatured monomers in which acid functionality may provide covalent bonding with PET while unsaturated monomer will mix with PP; application of hot melt adhesive: silane grafted amorphous polyolefins, isocyanate terminated polyurethanes, polyacrylates; and crosslinking via silane or urethane chemistry may allow covalent bonding with PET layer while polyolefin functionality allows the mixing with PP layer.

Figure 11A:
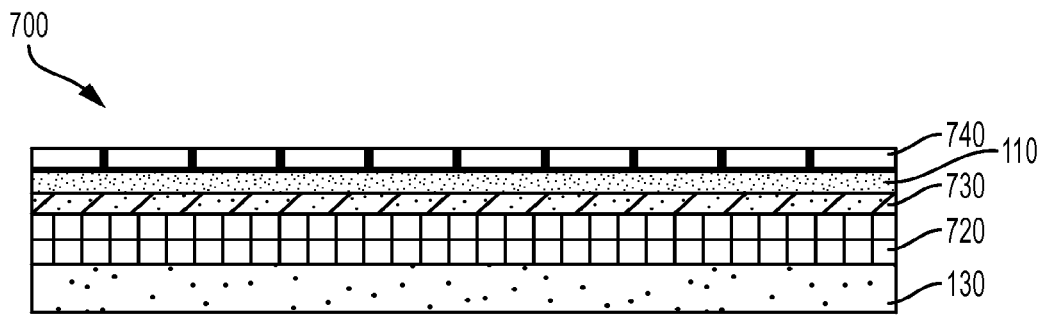
FIG. 11A is a cross-sectional view of a composite sheet material including a matrix.

With reference to FIG. 11A, a composite sheet material 700 used in a two heating process includes a substrate 130, a matrix 720, an adhesion promoting layer 730, a cover sheet 110 and a treatment layer 740. The matrix 720 may be any matrix discussed in this disclosure and preferably includes polypropylene at least at a surface opposite to a side adjacent the substrate 130. The cover sheet is preferably a BOPET film. The treatment layer 740 optionally provides a polyurethane and/or paint or decal friendly surface. A preferred secondary heat cycle for use with the following discussion of the composite sheet material 700 is a temperature of 190 to 220 C at a pressure of 60 to 120 psi and a dwell time of 15 to 60 seconds.

A first example of the adhesion promoting layer 730 is a EVA tie layer. Ethylene units of the adhesion promoting layer 730 may create a physical attraction to the polypropylene of the matrix 720 while acetate groups of the adhesion promoting layer 730 may promote attraction to PET end groups in the BOPET film of the cover sheet 110. Preferably the adhesion promoting layer 730 is thick enough to create/promote/enhance the PET-EVA attraction.

A second example of the adhesion promoting layer 730 is a EMA tie layer. Ethylene units of the adhesion promoting layer 730 may create a physical attraction to the polypropylene of the matrix 720 while maleic anhydride of the adhesion promoting layer 730 may promote reaction to PET end groups in the BOPET film of the cover sheet 110. Preferably the adhesion promoting layer 730 is thick enough to create/promote/enhance the PET-MA reaction.

Figure 12:
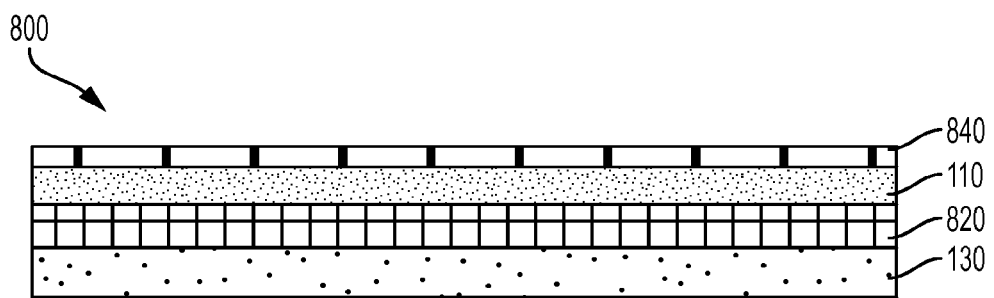
FIG. 12 is a cross sectional view of a composite sheet material including a matrix.

A third example is shown in FIG. 12, in which a composite sheet material 800 used in a two heating process includes a substrate 130, a matrix 820, a cover sheet 110 and a treatment layer 840. The matrix 820 may be any matrix discussed in this disclosure and preferably includes a layer of polypropylene and maleic anhydride at least at a surface opposite to a side adjacent the substrate 130. The inclusion of the maeleic anhydride in the matrix provides the adhesion promoting qualities of the second example of the adhesion promoting layer 730 without the extra layer. The treatment layer 840 is similar to the treatment layer 740.

In the examples discussed above, prior to combining the laminate to the substrate and applying the secondary heat cycle, there is a bond between layers that is adequate to hold these layers together. For example, if the ASTM D-3359 tape test is performed after the first heat cycle and before the second cycle, the layers may delaminate. During the secondary heating process, temperature exposures cause the materials to reorient and reduce the surface energy by "hiding" its functional groups in the subsurface layers. These examples provide primarily physical attraction rather than chemical bonding between PET and PP because the PP does not have reactive functional groups for covalent bonding. Thus, these examples may provide a "removable" cover sheet as the primary bond is physical rather than covalent.

The physical attraction depends on thermodynamics of the system and are effected by high temperatures. Since PP and PET are semi-crystalline, the temperature exposure in the secondary heat cycle may recreate crystals therefore eliminate or reduce any imperfections (such as PP adhered on PET layers or vice versa). This may especially be the case for PP since the exemplary secondary heating cycle is above the melt temperature of the PP.

Referring back to FIG. 11A, the adhesion promoting layer 730 may also be an adhesive tie layer including a family of oxazoline in an acrylic based resin, or the adhesive tie layer may include an ethylene acrylic acid copolymer mixed with oxazoline cross linker. These adhesive tie layers may improve adhesion of the PP and PET layers. The adhesion promoting layer 730 may be disposed on the back side of the cover sheet 110 when in contact with the polypropylene of the matrix 720 during the first heat cycle, which may produces the physical bond adequate to hold the material together. However, the bond (between the PP & PET) may becomes covalent after the secondary heating cycle and may be completely cross linked. Thus, this example may provide for a stronger, "permanent" bond between the cover sheet 110 and the matrix 720. For example, if the ASTM D-3359 tape test is perform the layers may not delaminate.

Figure 11B:
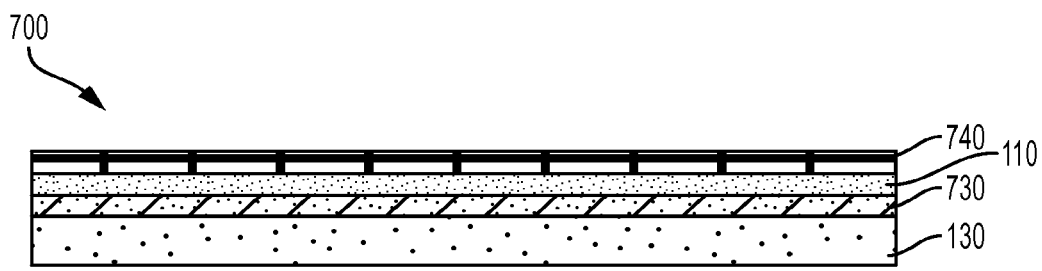
FIG. 11B is a cross-sectional view of a composite sheet material having a substrate, an adhesion promoting layer and a cover sheet.

The cover sheet or cover sheet laminate may also be applied directly to the top surface of the substrate, without a matrix, for example as shown in FIG. 11B. In this case, a bond, for example a permanent bond, between the cover sheet 110 or cover sheet laminate and the substrate 130 may be achieved. The adhesion promoting layer 730 disposed between the cover sheet 110 and the substrate 130 may be selected such that a first side promotes bonding with a material of the substrate 130 and a second side promotes bonding with a material of the cover sheet 110. In an example, the cover sheet may be PET (or BOPET) and the substrate may be PP. An exemplary material for the adhesion promoting layer 730 includes a family of oxazoline in an acrylic based resin, or the adhesive promoting layer 730 may include an ethylene acrylic acid copolymer mixed with oxazoline cross linker. These adhesive tie layers may improve adhesion of the PP and PET layers. The bond between the adhesion promoting layer 730 may be further promoted by coating it with additional polypropylene resin; or, the bond may also draw resin out from the material of the substrate 130 to facilitate the bonding.

A two process heating process may also be used in this embodiment. For example, the first heating process may be conducted at a temperature, pressure, and time to thermoform (combine) a separate cover sheet (or cover sheet laminate) and a first heat cycle for a substrate. The second heating process may occur when the cover sheet or cover sheet laminate are exposed to another heating step in further formation of the substrate.

In an embodiment, an additional bonding film may be provided on the bottom of the substrate (e.g., the side opposing the thermoplastic layers and/or the cover sheet). The bonding film may be PET and/or PU. An advantage of using a PET bonding layer is that it may facilitate a permanent bond to an end user's PU adhesive. A coated PP may also be used. A PU friendly surface as used throughout this disclosure may include a urethane prepolymer having an excess functional group at its end (e.g., its polymer chain is terminated with an isocyanate group, or alcohol groups) and an acrylic polymer, wherein the acrylic polymer includes a (meth)acrylic acid derivative that may provide a reactive adhesive tie-layer between PET and PU substrates. The PU friendly coating may be disposed on a top surface of the cover sheet to facilitate bonding urethane materials (including adhesives) to the cover sheet. The PU friendly coating may also be disposed on the PET bonding layer or film as a backer on the substrate to facilitate bonding the substrate to urethane materials (including adhesives).

In an embodiment, an additional layer of radio frequency (RF) shielding may be added to any of the embodiments described. Electromagnetic shielding may block radio frequency electromagnetic radiation and also be referred to as RF shielding. The shielding may reduce the coupling of radio waves, electromagnetic fields and electrostatic fields. For example, an RF shield layer may be added between a support component layer and a thermoplastic layer. In another example, the RF shield layer may be disposed between a support component and a substrate. In another example, the RF shield layer may be disposed between a thermoplastic layer and a permanent cover sheet. The RF shield layer may be made of aluminum foil. The RF shield layer can also be formed of aluminum foil laminated onto PET, or aluminum foil laminated onto PET coating with a bonding layer. For example, an aluminum film 0.0002" thick and 70" wide may be used. The aluminum foil may also be coated with an adhesion promoter on one or more sides. Another shielding method, such as an electronic shielding method, is to use a coating of a metallic ink or similar material. The ink may include a carrier material loaded with a metal (e.g., copper or nickel) in the form of very small particulates. It may be coated and, once dry, produce a continuous conductive layer of metal, which can be electrically connected to a chassis ground of electrical equipment, thus providing effective shielding. The RF shield layer may also be provided by adding conductive particles, such as Al, Cu or C, to a thermoplastic layer, for example, as a thin layer. The RF shield layer may also take the place of the support component.

It will be appreciated that the discussion of certain layers is not exclusive to those embodiments in which they are discussed. For example, a discussion of a support component in one embodiment may be combined with and is applicable to a discussion of a thermoplastic component of another embodiment.

The breadth and scope of the present disclosure should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, the claims should not be limited by the language chosen under a heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

The invention claimed is:

1. A method of making a composite sheet material, comprising:
   providing a cover sheet having a cover sheet material;
   providing a substrate having a substrate material;
   providing an adhesion promoting layer disposed between the cover sheet and the substrate;
   applying a first temperature above room temperature and first pressure above atmospheric pressure for a first time period to the cover sheet and the substrate as part of a first formation process that combines the cover sheet, the substrate and the adhesion promoting layer into a laminate;
   allowing the laminate to cool down to a lower temperature after the applying the first temperature and first pressure; and
   applying, after the allowing the laminate to cool down to the lower temperature, a second temperature above room temperature and second pressure above atmospheric pressure for a second time period to the laminate, wherein
   applying the second temperature and second pressure for a second time period provides a larger amount of energy to the laminate than the applying the first temperature and first pressure for the first time period provides to the laminate,
   a first side of the adhesion promoting layer disposed towards the cover sheet has an affinity to bond with the cover sheet material,
   a second side of the adhesion promoting layer disposed towards the substrate has an affinity to bond with the substrate material, and
   at least one of the first temperature and second temperature is above a melting point of a thermoplastic material of the composite sheet material.

2. The method of claim 1, wherein the cover sheet material includes polyethylene terephthalate.

3. The method of claim 1, wherein the substrate material includes polypropylene.

4. The method of claim 1, wherein the adhesion promoting layer includes a material selected from the group consisting of ethyl vinyl acetate, ethylene methyl acrylate, oxazoline, oxazoline disposed in an acrylic based resin, oxazoline cross linker, and oxazoline cross linker mixed with an ethylene acrylic acid.

5. The method of claim 1, wherein, before the applying the first temperature, the second side of the adhesion promoting layer includes a polypropylene coating.

6. The method of claim 1, further comprising providing a polyurethane adhesion promoting layer, wherein
   the cover sheet is disposed between the polyurethane adhesion promoting layer and the substrate, or
   the substrate is disposed between the polyurethane adhesion promoting layer and the cover sheet.

7. The method of claim 6, wherein the polyurethane adhesion promoting layer includes a material selected from the group consisting of a urethane prepolymer and an acrylic polymer.

8. The method of claim 1, wherein after the applying the first temperature, a bond between the adhesion promoting layer and the substrate is primarily a physical bond.

9. The method of claim 1, wherein after the applying the second temperature, bonds between the cover sheet, the adhesion promoting layer and the substrate are primarily covalent bonds.

10. The method of claim 1, wherein
after the applying the first temperature, a bond between the cover sheet, the adhesion promoting layer and the substrate is not sufficient to maintain adhesion if an ASTM D-3359 tape test is performed, and
after the applying the second temperature, a bond between the cover sheet, the adhesion promoting layer and the substrate is sufficient to maintain adhesion if an ASTM D-3359 tape test is performed.

11. The method of claim 1, wherein a bond between the adhesion promoting layer and the substrate is primarily a covalent bond.

12. The method of claim 1, wherein at least one of the first formation process and the applying the second temperature and second pressure includes melting a thermoplastic material.

13. The method of claim 1, wherein
the cover sheet material includes polyethylene terephthalate, and
the substrate material includes polypropylene.

14. A method of forming a composite sheet material, comprising:
applying a first temperature above room temperature and first pressure above atmospheric pressure to a plurality of layers for a first time period as part of a first formation process that increases the temperature of the plurality of layers and combines the plurality of layers into a laminate;
allowing the laminate to cool down to a lower temperature after the applying the first temperature and first pressure; and
applying, after the allowing the laminate to cool down to the lower temperature, a second temperature and second pressure above atmospheric pressure to the laminate and a substrate for a second time period as part of a second formation process that combines the laminate and the substrate, wherein
the applying the second temperature and second pressure for a second time period provides a larger amount of energy to the laminate and the substrate than the applying the first temperature and first pressure for the first time period provides to the laminate, and
at least one of the first temperature and second temperature is above a melting point of a thermoplastic material of the composite sheet material.

15. The method of claim 14, wherein the laminate includes an adhesion promoting layer and a layer including polyethylene terephthalate.

16. The method of claim 14, wherein the layers of the laminate include:
a thermoplastic layer having a thermoplastic layer material; and
a support thermoplastic membrane component having a thermoplastic membrane material.

17. The method of claim 16, wherein a concentration of the thermoplastic layer material at a first side of the laminate is greater than at a second, opposing side of the laminate.

18. The method of claim 16, wherein the thermoplastic layer material is selected from the group consisting of polypropylene, polyethylene, polyamide, combinations thereof, and copolymers thereof.

19. The method of claim 16, wherein the thermoplastic membrane material is selected from the group consisting of polyethylene terephthalate, polyethylene naphthalate, polyphenylsulfone, polysulfone, polyether sulfone, polyetherimide, polyamide, polyimide, combinations thereof, and copolymers thereof.

20. The method of claim 16, wherein the thermoplastic membrane material includes a porous material.

21. The method of claim 20, wherein the thermoplastic layer material is disposed in porous pathways of the porous material.

22. The method of claim 16, wherein the thermoplastic membrane material includes an apertured material.

23. The method of claim 22, wherein the thermoplastic layer material is disposed in apertures of the apertured material.

24. The method of claim 14, wherein a cover sheet is included with the plurality of layers in the steps of the applying the first temperature and applying the second temperature.

25. The method of claim 24, wherein the laminate includes polypropylene and the cover sheet includes biaxially-oriented polyethylene terephthalate.

26. The method of claim 24, wherein after the applying the first temperature, a bond between the cover sheet and an adjacent layer of the laminate is primarily a physical bond.

27. The method of claim 24, wherein after the applying the second temperature, a bond between the cover sheet and an adjacent layer of the laminate is primarily a covalent bond.

28. The method of claim 24, wherein
after the applying the first temperature, a bond between the cover sheet and an adjacent layer of the laminate is not sufficient to maintain adhesion if an ASTM D-3359 tape test is performed, and
after the applying the second temperature, a bond between the cover sheet and an adjacent layer of the laminate is sufficient to maintain adhesion if an ASTM D-3359 tape test is performed.

29. The method of claim 24, further comprising an adhesion promoting layer disposed between the cover sheet and an adjacent layer.

30. The method of claim 29, wherein the adhesion promoting layer includes oxazoline.

* * * * *